(12) United States Patent
Takahashi

(10) Patent No.: US 7,970,972 B2
(45) Date of Patent: Jun. 28, 2011

(54) INSERTION/REMOVAL DETECTOR

(75) Inventor: Ai Takahashi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 113 days.

(21) Appl. No.: 12/594,980

(22) PCT Filed: Apr. 20, 2007

(86) PCT No.: PCT/JP2007/058669
§ 371 (c)(1),
(2), (4) Date: Oct. 7, 2009

(87) PCT Pub. No.: WO2008/142742
PCT Pub. Date: Nov. 27, 2008

(65) Prior Publication Data
US 2011/0016248 A1    Jan. 20, 2011

(51) Int. Cl.
*H05K 7/10* (2006.01)
(52) U.S. Cl. ............ 710/301; 710/13; 710/16; 710/302; 713/320; 713/323; 713/324
(58) Field of Classification Search .................... 710/13, 710/16, 301, 302; 713/320, 323, 324
See application file for complete search history.

(56) References Cited

U.S. PATENT DOCUMENTS

| | | | | |
|---|---|---|---|---|
| 5,613,130 A * | 3/1997 | Teng et al. | ..................... | 713/300 |
| 5,671,368 A * | 9/1997 | Chan et al. | ..................... | 710/301 |
| 7,069,369 B2 * | 6/2006 | Chou et al. | ..................... | 710/301 |
| 7,086,583 B2 * | 8/2006 | Wurzburg | ..................... | 235/375 |
| 7,159,766 B2 * | 1/2007 | Wurzburg et al. | ............ | 235/376 |
| 7,171,447 B2 * | 1/2007 | Kawamoto et al. | ........... | 709/204 |
| 7,210,619 B2 * | 5/2007 | Wurzburg | ..................... | 235/375 |
| 7,254,650 B2 * | 8/2007 | Lin et al. | .......................... | 710/11 |
| 7,325,733 B2 * | 2/2008 | Wurzburg et al. | ............ | 235/441 |
| 7,360,001 B2 * | 4/2008 | Tashiro | ............................ | 710/72 |
| 7,430,625 B2 * | 9/2008 | Floman et al. | ................ | 710/104 |
| 7,539,808 B2 * | 5/2009 | Kojima | .......................... | 710/302 |

(Continued)

FOREIGN PATENT DOCUMENTS
JP    06-131079 A    5/1994
(Continued)

OTHER PUBLICATIONS

SD Group. SD Specifications. Version 1.10. Apr. 3, 2006.*

(Continued)

*Primary Examiner* — Matthew D Spittle
(74) *Attorney, Agent, or Firm* — Pearne & Gordon LLP

(57) ABSTRACT

With an external memory to be inserted and removed through an adapter, insertion and removal of the external memory are reliably detected and data destruction with insertion or removal is prevented. A detector includes a card detection section (32) for detecting that a memory card (10) has been inserted into a connector (31), acquiring the ID of the detected memory card (10), and acquiring card information of the memory card (10), an application section (36) for making an access request to a memory card, and a card access section (34) for acquiring the ID of a memory card (11) inserted into the connector (31) at the time of the access request, making a comparison between the ID of the memory card (10) and the ID of the memory card (11), determining whether or not the IDs are identical, and acquiring card information concerning the memory card (11) if the IDs are not identical.

5 Claims, 10 Drawing Sheets

U.S. PATENT DOCUMENTS

| | | | |
|---|---|---|---|
| 7,886,104 B2* | 2/2011 | Lai et al. | 710/301 |
| 2005/0076182 A1* | 4/2005 | Minne | 711/163 |
| 2005/0251593 A1* | 11/2005 | Lin et al. | 710/62 |
| 2006/0015673 A1* | 1/2006 | Morrow | 710/315 |
| 2006/0172606 A1* | 8/2006 | Irisawa | 439/630 |
| 2008/0016266 A1* | 1/2008 | Liu | 710/311 |

FOREIGN PATENT DOCUMENTS

| | | |
|---|---|---|
| JP | 11-085915 A | 3/1999 |
| JP | 2005-086514 A | 3/2005 |
| JP | 2005-284805 A | 10/2005 |

OTHER PUBLICATIONS

San Disk. SanDisk SD Card. Product Manual. Version 2.2. Nov. 2004.*
Panasonic. Adapter for miniSD card. Data sheet. Jul. 2004.*
TwinMOS Technologies Inc. Micro SD Card. Product Specification. Version 1.0. 2001.*
PQI. Secure Digital Card. Data sheet. Revision A.O. Jan. 2007.*
International Search Report for PCT/JP2007/058669.

* cited by examiner

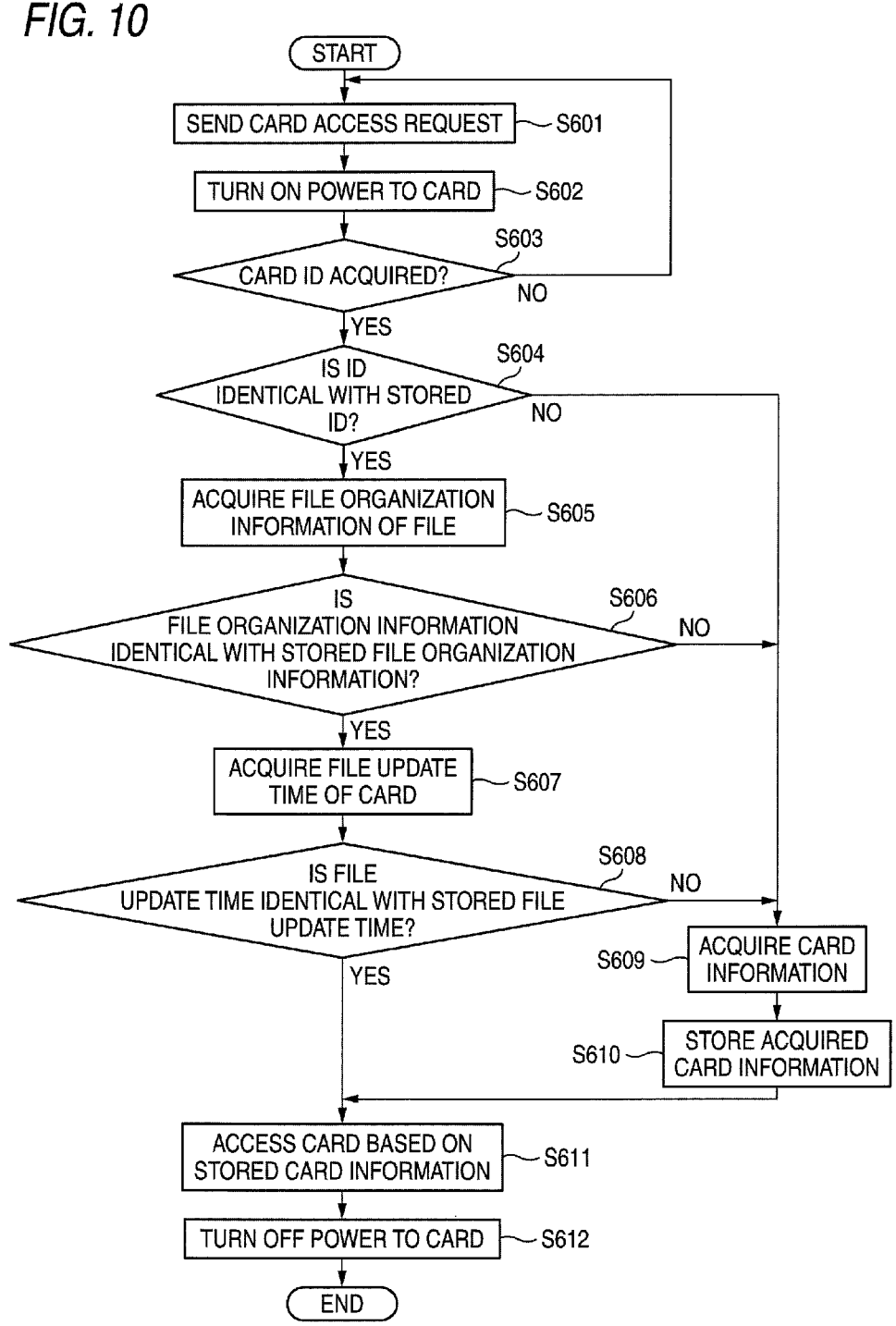

INSERTION/REMOVAL DETECTOR

TECHNICAL FIELD

This invention relates to an insertion/removal detector for detecting insertion and removal of external memory used with an electronic apparatus into and from a connector.

BACKGROUND

In recent years, in an electronic apparatus such as a digital camera or a mobile information terminal, external memory including semiconductor memory such as a memory card or flash memory, inserted/removed for use has been widely used to record and retain data. To prevent data destruction and malfunction from occurring at the inserting or removing, the electronic apparatus using such external memory is provided with an insertion/removal detector for detecting insertion and removal of external memory into and from a connector.

Hitherto, as this kind of insertion/removal detector, for example, a device has been available for detecting insertion and removal of external memory by connecting a resistor in series to a power line for supplying power to a memory card as external memory of a terminal and determining whether the voltage across the ends is high or low (for example, refer to patent document 1).

However, it is difficult to apply the conventional insertion/removal detector described above to a terminal requiring a power saving function or a terminal which must be operated with limited power because power needs to be always supplied to the memory card, and there is a demand for an insertion/removal detector for enabling power to be supplied only at the necessary time.

There is a device including an insertion detection switch for detecting insertion of a memory card into a terminal and a pull-down contact for determining the type of inserted memory card, the device for detecting insertion of only a memory card that can be applied to the terminal as the insertion detection switch is turned on and the pull-down contact goes high (for example, refer to patent document 2).

In this example, since insertion and removal of a memory card are detected mechanically by the insertion detection switch, it is unnecessary to always supply power. However, to insert a memory card through an adapter, if only the memory card is removed or inserted with the adapter left in a slot of the terminal, the insertion detection switch is always held on because the adapter remains inserted. Thus, removal or insertion of only the memory card cannot be detected.

In a terminal for storing data of a memory card in internal memory of the terminal or a terminal for referencing data recorded in internal memory to access a memory card, when the memory card is replaced, removal or insertion of only the memory card cannot be detected. Thus, there is a possibility that erroneous data may be recorded or that the data in a new memory card may be destroyed by accessing the new memory card in a similar way to access the replaced old memory card.

Patent document 1: JP-A-6-131079
Patent document 2: JP-A-11-85915

DISCLOSURE OF THE INVENTION

Problems to be Solved by the Invention

In view of the circumstances described above, it is an object of the invention to provide an insertion/removal detector capable of detecting insertion and removal of external memory with the external memory to be inserted and removed through an adapter, and capable of preventing recorded data from being destroyed with insertion or removal of external memory.

Means for Solving the Problems

In order to achieve the object, there is provided an insertion/removal detector according to a first aspect of the invention, the insertion/removal detector including: an insertion detection section which is adapted to detect that an adapter into which an external memory is inserted has been inserted into a connector for inserting the adapter; a first identification information acquisition section which is adapted to acquire first identification information to identify first external memory which the insertion has been detected by the insertion detection section; a first external memory information acquisition section which is adapted to acquire first external memory information concerning the first external memory; an access request section which is adapted to send an access request to the first external memory; a second identification information acquisition section which is adapted to acquire second identification information to identify second external memory inserted into the adapter inserted into the connector at the time of the access request; an identification information comparison section which is adapted to make a comparison between the first identification information and the second identification information and to determine whether or not they are identical; and a second external memory information acquisition section which is adapted to acquire second external memory information concerning the second external memory if the identification information comparison section determines not identical.

According to the configuration, the ID of the external memory is acquired, whereby whether or not the external memory is inserted into the adapter can be detected. If the ID comparison section determines that the ID of the external memory inserted at present differs from the ID of the previously inserted external memory, it is made possible to detect that the previously inserted external memory is removed and different external memory is inserted at present, and recorded data can be prevented from being destroyed with insertion or removal of external memory.

There is provided an insertion/removal detector according to a second aspect of the invention, the insertion/removal detector further including: a first file organization information acquisition section which is adapted to acquire first file organization information concerning file organization of the first external memory; a second file organization information acquisition section which is adapted to acquire second file organization information concerning file organization of the second external memory if the identification information comparison section determines be identical; and a file organization information comparison section which is adapted to make a comparison between the first file organization information and the second file organization information and to determine whether or not they are identical, wherein if the file organization information comparison section determines not identical, the second external memory information acquisition section is adapted to acquire the second external memory information.

According to the configuration, if the file organization information comparison section determines that the file organization of the external memory inserted at present differs from the file organization of the previously inserted external memory, it can be determined that the external memory is once removed and the file organization is updated in another apparatus and the external memory is again inserted; if the file organization information comparison section determines that the file organizations are identical, it can be determined that the same external memory remains inserted and the file organization is not updated. Therefore, if the same external memory is inserted, it is made possible to detect whether or not the file organization is updated halfway by another apparatus, and recorded data can be prevented from being destroyed with insertion or removal of external memory.

There is provided an insertion/removal detector according to a third aspect of the invention, the insertion/removal detector further including: a first update time information acquisition section which is adapted to acquire first update time information concerning file update time of the first external memory; a second update time information acquisition section which is adapted to acquire second update time information concerning file update time of the second external memory if the file organization information comparison section determines be identical; and an update time information comparison section which is adapted to make a comparison between the first update time information and the second update time information and to determine whether or not they are identical, wherein if the update time information comparison section determines not identical, the second external memory information acquisition section is adapted to acquire the second external memory information.

According to the configuration, if the update time information comparison section determines that the file update time of the external memory inserted at present differs from the file update time of the previously inserted external memory, it can be determined that the external memory is once removed and the file contents are updated in another apparatus and the external memory is again inserted; if the update time information comparison section determines that the file update times are identical, it can be determined that the same external memory remains inserted and none of the files are updated. Therefore, if the same external memory is inserted, it is made possible to detect whether or not the file contents are updated halfway by another apparatus, and recorded data can be prevented from being destroyed with insertion or removal of external memory.

There is provided an insertion/removal detector according to a fourth aspect of the invention, wherein the second external memory information acquisition section is adapted to acquire difference information concerning a difference between the first external memory information and the second external memory information.

According to the configuration, if the same external memory is inserted, it is not necessary to acquire all of the information stored in the external memory, so that the time taken for acquiring and storing the external memory information can be shortened.

There is provided an insertion/removal detector according to a fifth aspect of the invention, wherein the insertion detection section includes a detection circuit for detecting that the adapter has been inserted into the connector.

According to the configuration, it is made possible to physically detect that the adapter has been inserted into the connector.

Advantages of the Invention

According to the invention, there can be provided an insertion/removal detector capable of detecting insertion and removal of external memory with the external memory to be inserted and removed through an adapter, and capable of preventing recorded data from being destroyed with insertion or removal of external memory.

BRIEF DESCRIPTION OF THE DRAWINGS

FIG. 10 is a flowchart to describe a card access processing procedure of the memory card insertion/removal detector in the third embodiment of the invention.

DESCRIPTION OF REFERENCE NUMERALS

Figure 1:
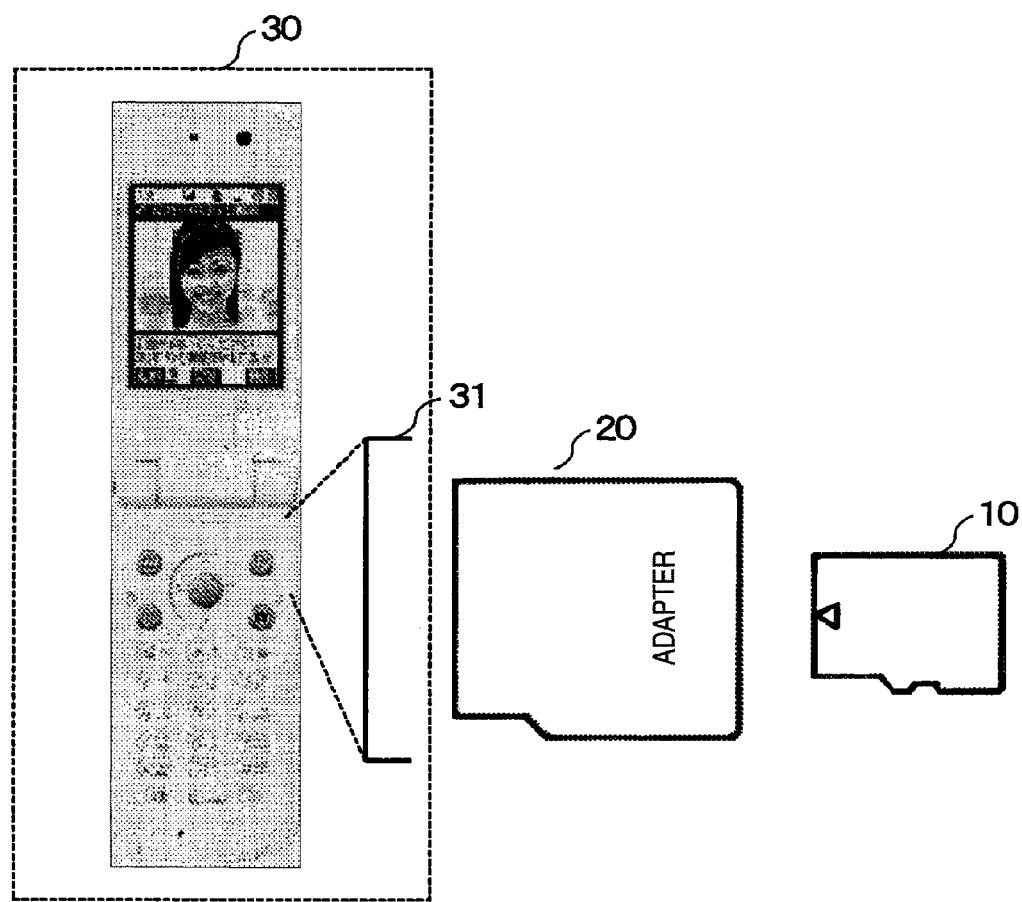
FIG. 1 is an image graphic to show the schematic configuration of a memory card insertion/removal detector of each embodiment according to the invention in a terminal.

10, 11 Memory card
20 Adapter
30, 40, 50 Terminal
31 Connector
321 Card detection section
322, 341 Card ID acquisition section
323$m$ 343 Card information acquisition section
331 Card ID storage section
332 Card information storage section
342 Card ID comparison section
344 File access section
35 Card power control unit
36 Application section
424, 445 File organization information acquisition section
433 File organization information storage section
446 File organization information comparison section
525, 547 File update time acquisition section
534 File update time storage section
548 File update time comparison section

BEST MODE FOR CARRYING OUT THE INVENTION

Each embodiments of the invention illustrate a memory card insertion/removal detector for detecting insertion and removal of a memory card used in a terminal as an insertion/removal detector. FIG. 1 is an image graphic to show the schematic configuration of a memory card insertion/removal detector of each of the embodiments in a terminal. In the figure, a memory card insertion/removal detector provided in a terminal 30 detects insertion and removal of a memory card 10 attached to an adapter 20 inserted into a connector 31 of the terminal 30 for use. Embodiments of the memory card insertion/removal detector according to the invention will be discussed below:

First Embodiment

Figure 2:
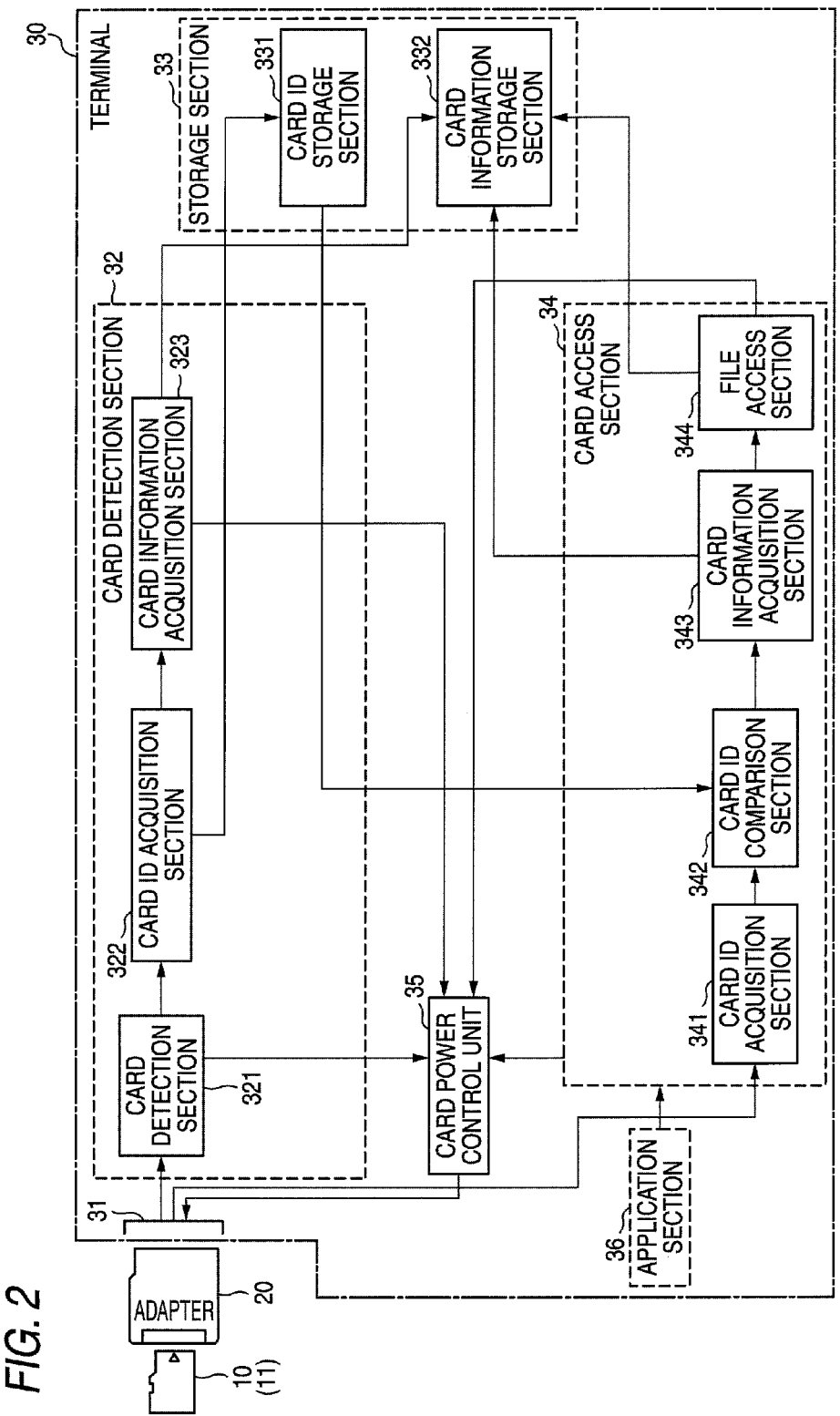
FIG. 2 shows the schematic configuration of a memory card insertion/removal detector in a first embodiment of the invention.

FIG. 2 shows the schematic configuration of a memory card insertion/removal detector according to a first embodiment of the invention. In FIG. 2, the memory card insertion/removal detector of a terminal 30 includes a connector 31, a card detection section 32, a storage section 33, a card access section 34, a card power control unit 35, and an application section 36. The memory card insertion/removal detector is an example of "insertion/removal detector."

The connector 31 includes a plurality of contacts for contact with a terminal of an adapter 20 to which a memory card 10 is attached; as the adapter 20 is inserted, the connector electrically connects the adapter with the terminal 30.

The card detection section 32 includes a card detection section 321 for detecting insertion of the adapter 20 to which the memory card 10 is attached into the connector by mechanical means (such as a detection circuit) of a switch, etc., a card ID acquisition section 322 for acquiring the ID of the memory card 10 inserted into the adapter 20 which the insertion has been detected, and a card information acquisition section 323 for acquiring card information of the memory capacity, a file system, etc., of the memory card 10.

The card detection section 321 has a function as "insertion detection section." The card ID acquisition section 322 has a function as "first identification information acquisition section." The card information acquisition section 323 has a function as "first external memory information acquisition section."

The storage section 33 includes a card ID storage section 331 for storing the ID of the memory card 10 acquired by the card ID acquisition section 322 and a card information storage section 332 for storing the card information of the memory card 10 acquired by the card information acquisition section 323.

The card access section 34 includes a card ID acquisition section 341 for acquiring the ID of a memory card 11 inserted at present into the connector 31 through the adapter 20 when the application section 36 is initiated by the user pressing a key, etc., and issues a card access request, a card ID comparison section 342 for making a comparison between the acquired ID and the ID stored in the card ID storage section 331 and determining whether or not the IDs are identical, a card information acquisition section 343 for acquiring the card information of the memory card 10 if the IDs differ as a result of the determination of the card ID comparison section 342, and a file access section 344 for accessing the memory card 10 based on the acquired card information.

The card ID acquisition section 341 has a function as "second identification information acquisition section." The card information acquisition section 343 has a function as "second external memory information acquisition section." The card ID comparison section 342 has a function as "identification information comparison section."

The card power control unit 35 performs on/off control of power supply to the memory card 10 in response to the operation of the card detection section 32 and the card access section 34.

The application section 36 executes various applications and sends a card access request to the card access section 34 to acquire information from the memory card 10 as required.

The application section 36 has a function as "access request section."

Next, the operation of the memory card insertion/removal detector of the embodiment configured as described above will be discussed.

Figure 3:
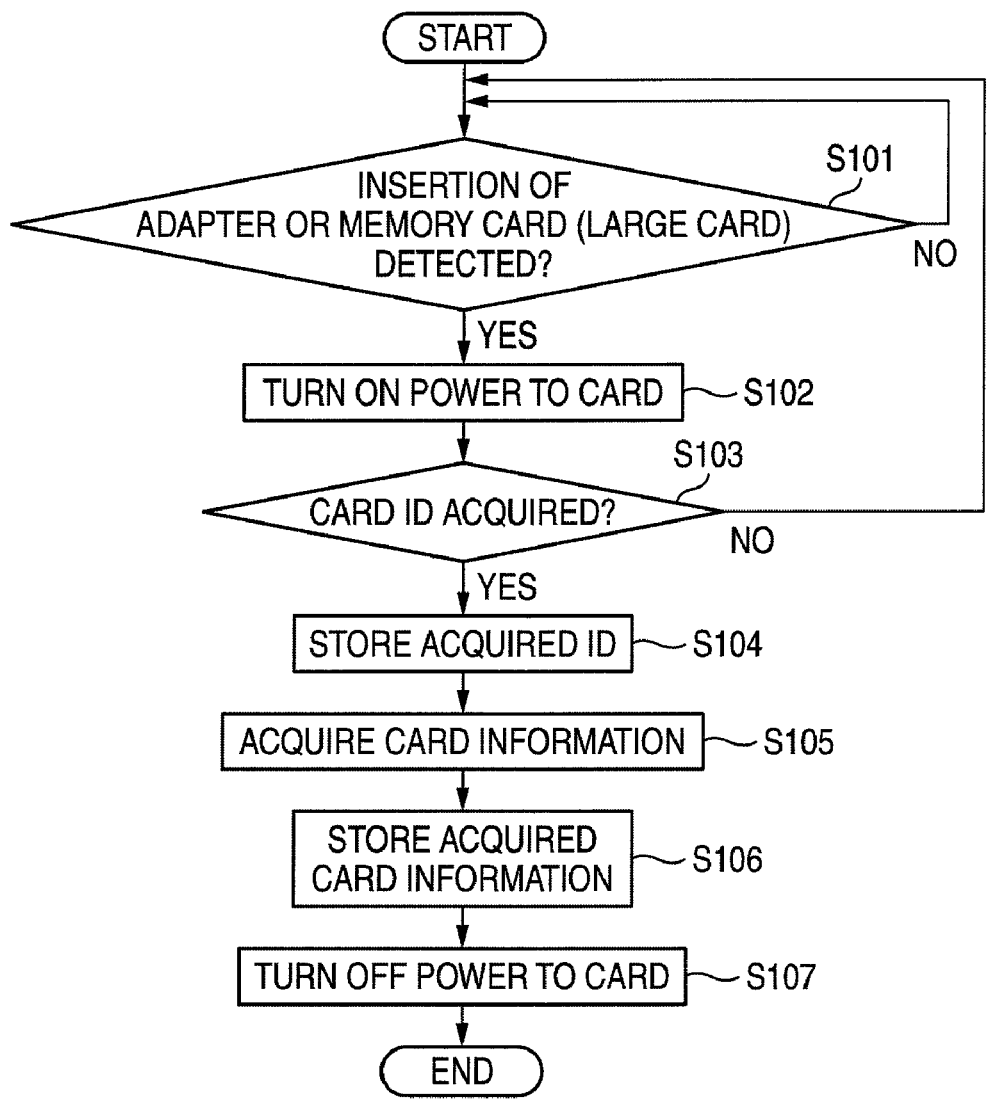
FIG. 3 is a flowchart to describe a card detection processing procedure of the memory card insertion/removal detector in the first embodiment of the invention.

To begin with, the memory card detection operation when the memory card 10 attached to the adapter 20 is inserted into the connector 31 of the terminal 30 will be discussed. FIG. 3 is a flowchart to describe a memory card detection processing procedure of the embodiment.

First, whether or not the card detection section 321 detects insertion of the adapter 20 into and from which the memory card 10 can be inserted and removed is determined (step S101). If insertion of the adapter 20 is detected as a result of the determination, the card power control unit 35 starts to supply power to the memory card 10 inserted into the adapter 20 (step S102). The card detection section 321 can also detect insertion of a large-type (i.e., ordinary) memory card 10 which need not be inserted into the adapter 20.

Next, the card ID acquisition section 322 acquires the ID of the memory card 10 (step S103) and stores the ID in the card ID storage section 331 of the storage section 33 contained in internal memory of the terminal 30 (step S104). If the ID of the memory card 10 cannot be acquired at step S103, the memory card 10 is not inserted into the adapter 20.

Subsequently, the card information acquisition section 323 acquires the card information of the memory capacity, the file system, etc., of the memory card 10 (step S105) and stores the acquired card information in the card information storage section 332 of the storage section 33 (step S106).

When the card power control unit 35 is informed of completion of acquisition and storage of the card information from the card information acquisition section 323, it stops power supply to the memory card 10 for power saving (step S107).

Figure 4:
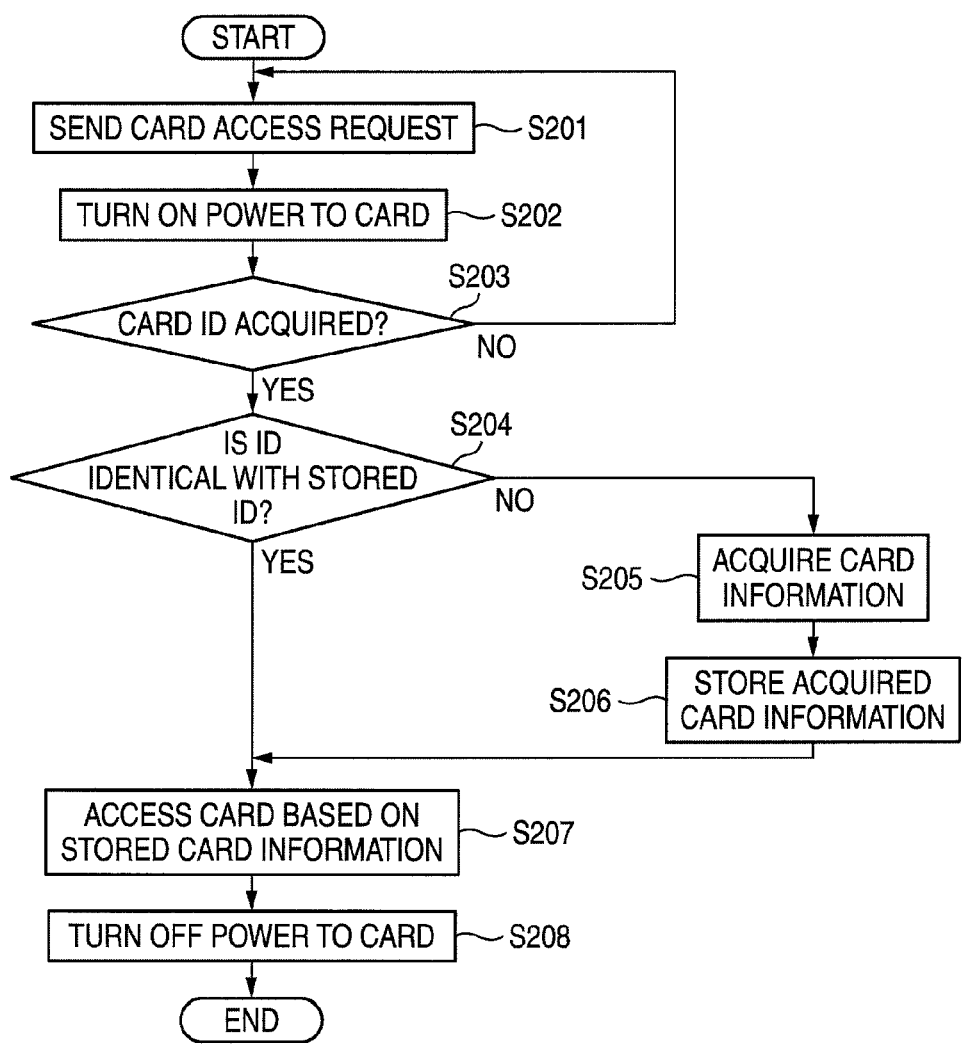
FIG. 4 is a flowchart to describe a card access processing procedure of the memory card insertion/removal detector in the first embodiment of the invention.

Next, the access operation to the memory card 11 inserted into the connector 31 at present will be discussed. FIG. 4 is a flowchart to describe a processing procedure of the access operation to the memory card 11 in the embodiment.

The user operates the terminal and presses a key, etc., whereby the application section 36 issues a card access request to the card access section 34 (step S201).

Upon reception of the card access request, the card access section 34 transmits the request to the card power control unit 35 and causes the card power control unit to start power supply to the memory card 11 (step S202) and acquires the ID of the memory card 11 inserted into the connector 31 at present by the card ID acquisition section 341 (step S203).

Next, the card ID comparison section 342 makes a comparison between the acquired ID of the memory card 11 this time and the ID of the memory card 10 stored in the card ID storage section 331 and determines whether or not the IDs are identical (step S204).

If both the IDs differ as a result of the determination, it is determined that the memory card 11 different from the previously detected memory card 10 is inserted, and the card information acquisition section 343 acquires the card information of the memory card 11 inserted into the connector 31 at present (step S205) and stores the acquired card information in the card information storage section 332 of the storage section 33 (step S206).

Subsequently, the file access section 344 accesses the memory card 11 based on the card information of the memory card 11 stored in the card information storage section 332 (step S207). Then, to save power, the card power control unit 35 stops power supply to the memory card 11 (step S208).

On the other hand, if both the IDs are identical as a result of the determination at step S204, steps S205 and S206 are skipped and the process goes to step S207 and the memory card is accessed based on the card information of the memory card 10 stored in the card information storage section 332 (step S207).

As described above, according to the insertion/removal detector in the first embodiment of the invention, insertion of a memory card or insertion of only an adapter can be detected by acquiring the ID of the memory card. The ID of the memory card inserted at present is acquired and is compared with the previously stored ID, whereby whether or not the previously inserted memory card and the memory card inserted at present are identical can be detected. Further, if a different memory card is inserted, it is made possible to take measures of anew acquiring card information from the memory card inserted at present, etc., so that destruction of the data recorded on the memory card can be prevented.

Second Embodiment

Figure 5:
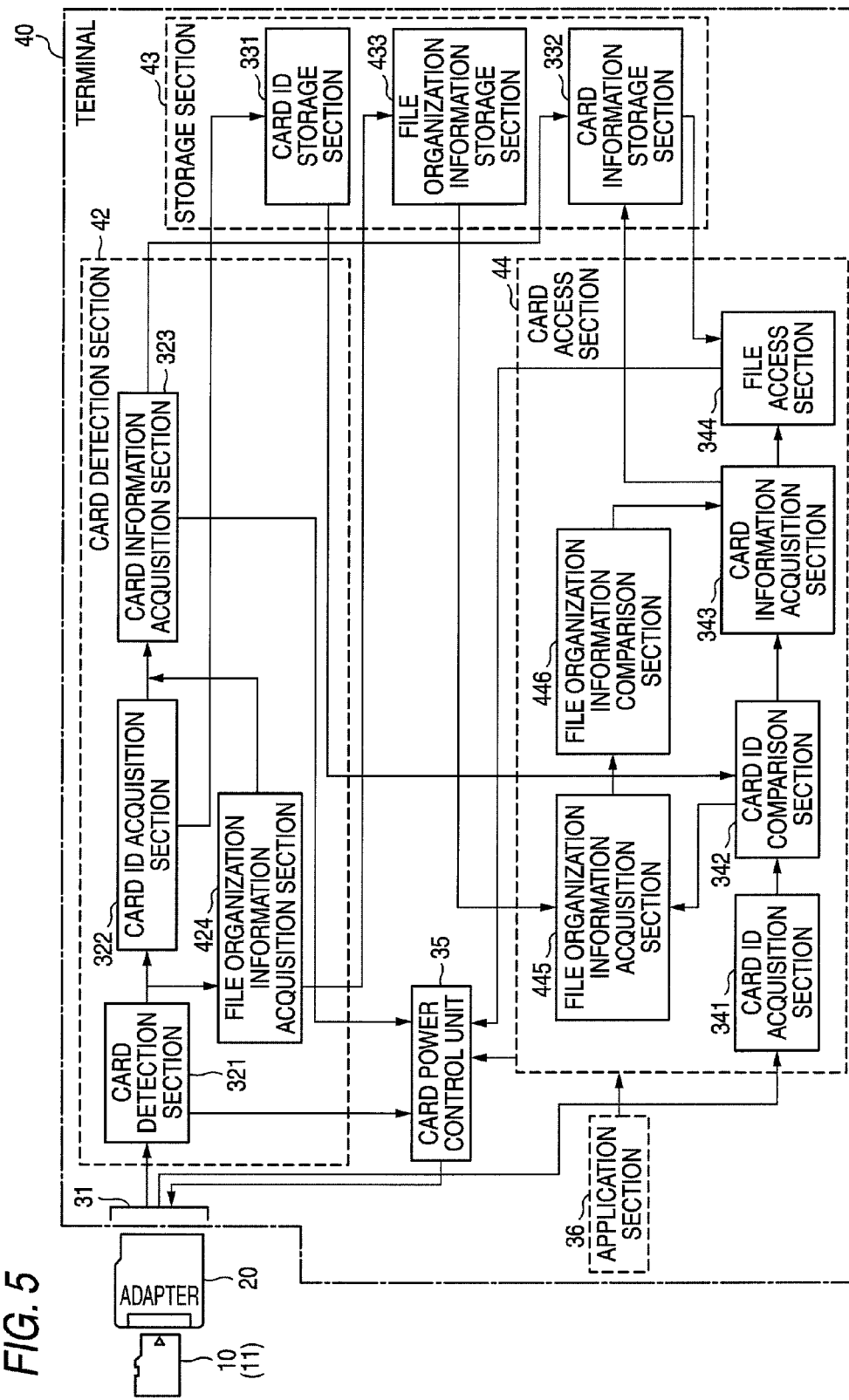
FIG. 5 shows the schematic configuration of a memory card insertion/removal detector in a second embodiment of the invention.

FIG. 5 shows the schematic configuration of a memory card insertion/removal detector according to a second embodiment of the invention. In FIG. 5, the memory card insertion/removal detector of a terminal 40 includes a connector 31, a card detection section 42, a card storage section 43, a card access section 44, a card power control unit 35, and an application section 36. Components identical with those of the memory card insertion/removal detector of the first embodiment shown in FIG. 2 are denoted by the same reference numerals and will be briefly discussed or will not be discussed again.

The card detection section 42 further includes a file organization information acquisition section 424 for acquiring file organization information of a memory card 10 in addition to the components of the card detection section 32 in the memory card insertion/removal detector of the first embodiment shown in FIG. 2. The file organization information acquisition section 424 has a function as "first file organization information acquisition section."

The card storage section 43 further includes a file organization information storage section 433 for storing file organization information of the memory card 10 acquired by the file organization information acquisition section 424 in addition to the components of the card storage section 33 in the memory card insertion/removal detector of the first embodiment shown in FIG. 2.

The card access section 44 further includes a file organization information acquisition section 445 for acquiring file organization information of a memory card 11 inserted at present and a file organization information comparison section 446 for making a comparison between the acquired file organization information and the file organization information stored in the file organization information storage section 433 and determining whether or not they are identical in addition to the components of the card access section 34 in the memory card insertion/removal detector of the first embodiment shown in FIG. 2. The file organization information acquisition section 445 has a function as "second file organization information acquisition section."

Next, the operation of the memory card insertion/removal detector of the embodiment configured as described above will be discussed.

Figure 6:
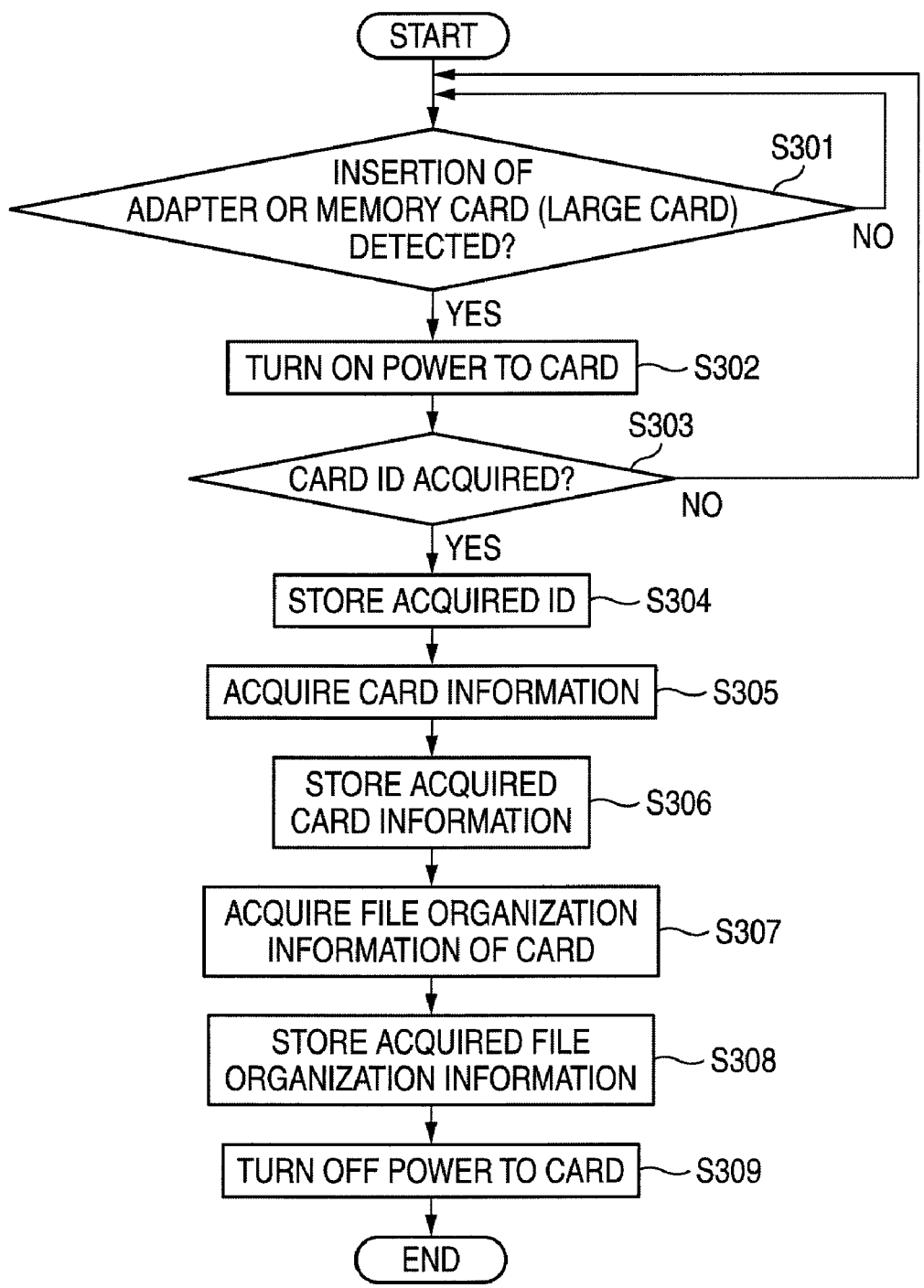
FIG. 6 is a flowchart to describe a card detection processing procedure of the memory card insertion/removal detector in the second embodiment of the invention.

To begin with, the memory card detection operation when the memory card 10 attached to an adapter 20 is inserted into the connector 31 of the terminal 40 will be discussed. FIG. 6 is a flowchart to describe a memory card detection processing procedure of the embodiment.

In FIG. 6, steps S301 to S306 and S309 are the same as steps S101 to S107 in the flowchart of FIG. 3 in the first embodiment and will not be discussed again.

At step S307, the file organization information acquisition section 424 acquires the file organization information of the memory card 10 and at step S308, the file organization information acquired by the file organization information acquisition section 424 is stored in the file organization information storage section 433 of the storage section 43.

Figure 7:
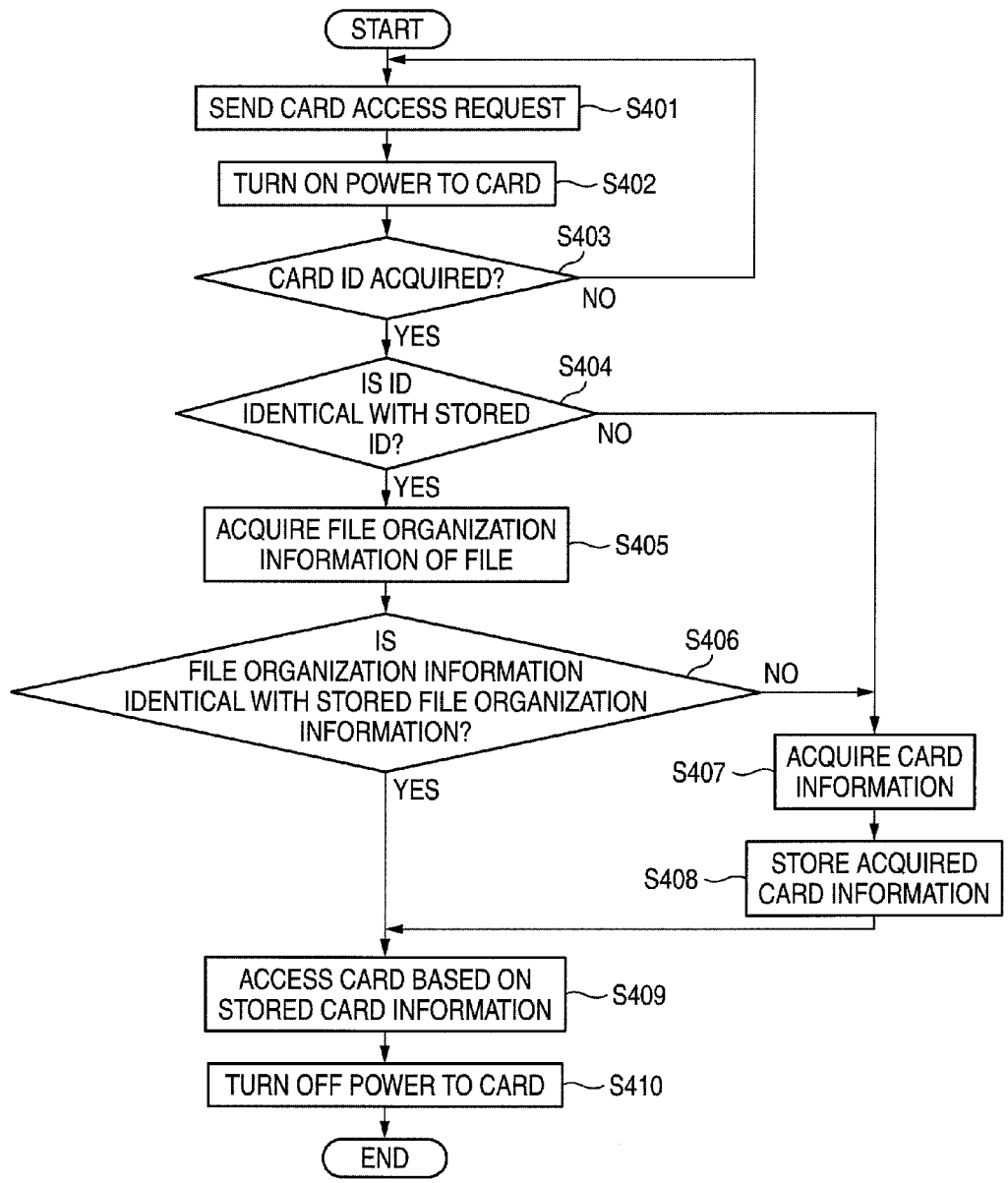
FIG. 7 is a flowchart to describe a card access processing procedure of the memory card insertion/removal detector in the second embodiment of the invention.

Next, the access operation to the memory card 11 inserted into the connector 31 at present will be discussed. FIG. 7 is a flowchart to describe a processing procedure of the access operation to the memory card in the embodiment.

In FIG. 7, steps S401 to S404 and steps S407 to S410 are the same as steps S201 to S204 and steps S205 to S208 in the flowchart of FIG. 4 in the first embodiment and will not be discussed again.

At step S405, the file organization information acquisition section 445 of the card access section 44 acquires the file organization information from the memory card 11. At step S406, the file organization information comparison section 446 makes a comparison between the acquired file organization information of the card this time and the file organization information stored in the file organization information storage section 433 of the storage section 43 and determines whether or not they are identical.

If the file organization information differs as a result of the determination, at step S407 it is determined that the previously inserted memory card 10 is once removed and a file is deleted or is recorded on the memory card in another terminal and then the memory card is inserted, and the card information acquisition section 343 acquires the card information from the memory card 11 inserted into the connector 31 at present. At step S408, the card information acquired by the card information acquisition section 343 is stored in the card information storage section 332 of the storage section 43.

The card information acquisition section 343 of the card access section 44 need not necessarily acquire all the card information of the memory card 11 inserted at present and may acquire only any different parts from the previously acquired card information based on the comparison processing result of the file organization information comparison section 445. Accordingly, the time required for acquiring the card information can be shortened.

On the other hand, at step S406, it is determined that the file organization information is identical, steps S407 and S408 are skipped and the process goes to step S409 and the memory card is accessed based on the card information of the memory card 10 stored in the card information storage section 332.

As described above, according to the insertion/removal detector in the second embodiment of the invention, the file organization information is acquired and is compared with the previously stored file organization information in addition to the process of acquiring the ID of the inserted memory card and comparing the ID with the previously stored ID, whereby whether or not the previously inserted memory card and the memory card inserted at present are identical can be detected. If the same memory card is inserted, it is made possible to detect whether or not the memory card is removed halfway and a file is deleted or is recorded on the memory card in another terminal. Further, if a different memory card is inserted or if the file contents are changed although the same memory card is inserted, it is made possible to take measures of anew acquiring card information from the memory card inserted at present, etc., and destruction of the data recorded on the memory card can be prevented.

Third Embodiment

Figure 8:
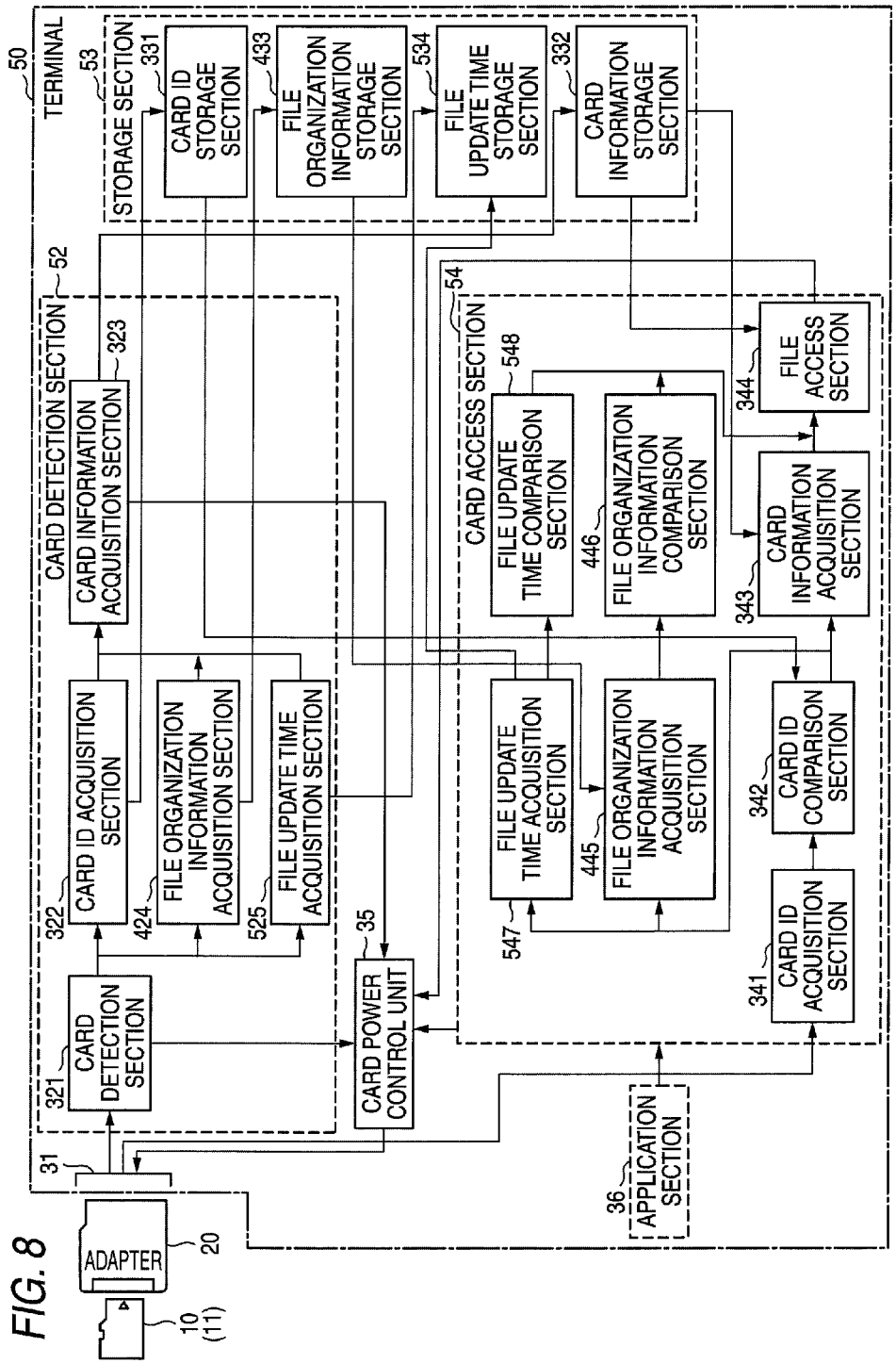
FIG. 8 shows the schematic configuration of a memory card insertion/removal detector in a third embodiment of the invention.

FIG. 8 shows the schematic configuration of a memory card insertion/removal detector according to a third embodiment of the invention. In FIG. 8, the memory card insertion/removal detector of a terminal 50 includes a connector 31, a card detection section 52, a card storage section 53, a card access section 54, a card power control unit 35, and an application section 36. Components identical with those of the memory card insertion/removal detectors of the first and second embodiments shown in FIGS. 2 and 5 are denoted by the same reference numerals and will be briefly discussed or will not be discussed again.

The card detection section 52 further includes a file update time acquisition section 525 for acquiring the file update time of a memory card 10 in addition to the components of the card detection section 42 in the memory card insertion/removal detector of the second embodiment shown in FIG. 5. The file update time acquisition section 525 has a function as "first update execution information acquisition section."

The card storage section 53 further includes a file update time storage section 534 for storing the file update time of the memory card 10 acquired by the file update time acquisition section 525 in addition to the components of the card storage section 43 in the memory card insertion/removal detector of the second embodiment shown in FIG. 5.

The card access section 54 further includes a file update time acquisition section 547 for acquiring the file update time of a memory card 11 inserted at present and a file update time comparison section 548 for making a comparison between the acquired file update time and the file update time stored in the file update time storage section 534 and determining whether or not they are identical in addition to the components of the card access section 54 in the memory card insertion/removal detector of the second embodiment shown in FIG. 5. The file update time acquisition section 547 has a function as "second update time information acquisition section." The file update time comparison section 548 has a function as "update time information comparison section."

Next, the operation of the memory card insertion/removal detector of the embodiment configured as described above will be discussed.

Figure 9:
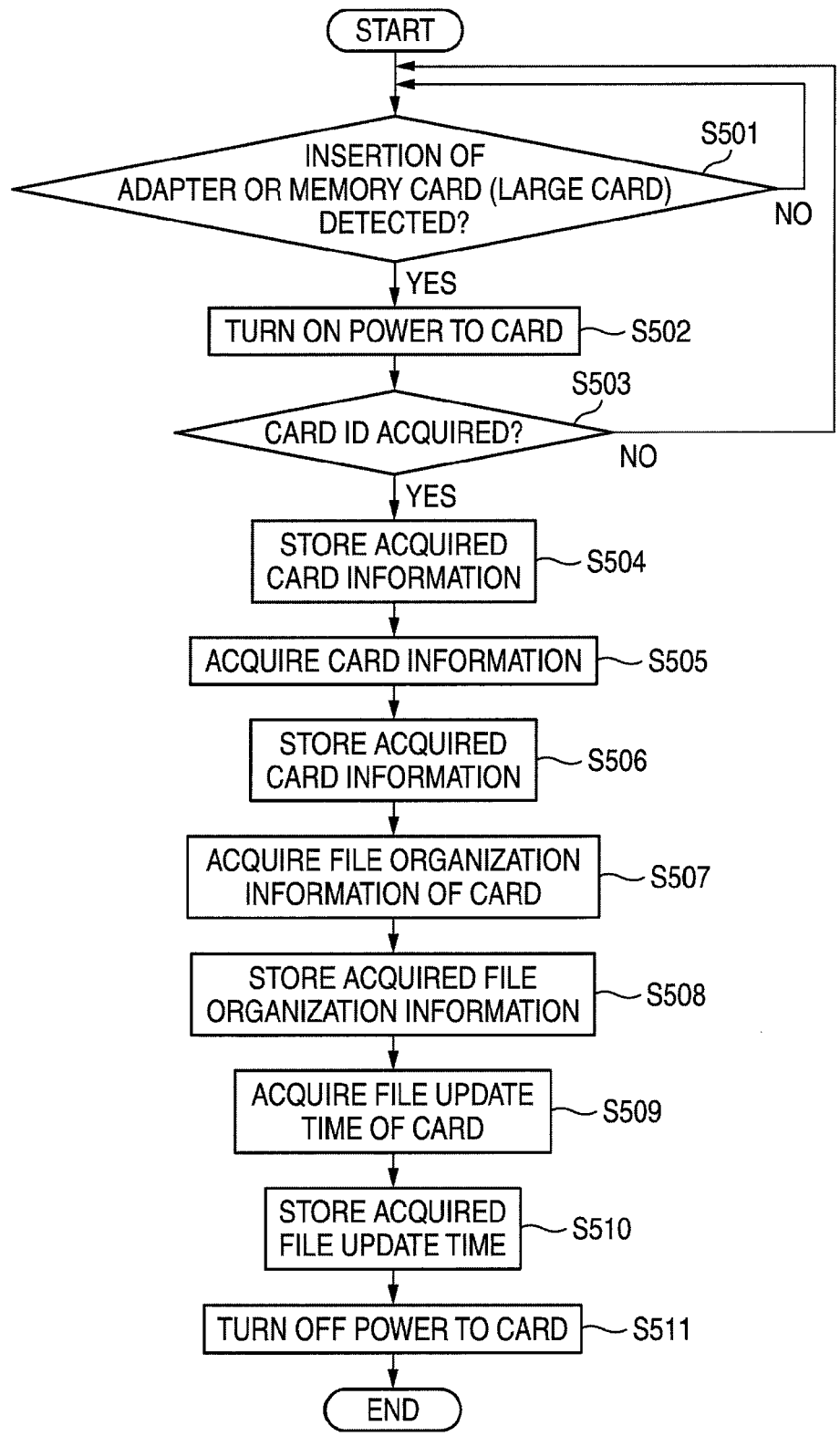
FIG. 9 is a flowchart to describe a card detection processing procedure of the memory card insertion/removal detector in the third embodiment of the invention.

To begin with, the memory card detection operation when the memory card 10 attached to an adapter 20 is inserted into the connector 31 of the terminal 50 will be discussed. FIG. 9 is a flowchart to describe a memory card detection processing procedure of the embodiment.

In FIG. 9, steps S501 to S508 and S511 are the same as steps S301 to S309 in the flowchart of FIG. 6 in the second embodiment and will not be discussed again.

At step S509, the file update time acquisition section 525 of the card detection section 52 acquires the file update time of the memory card 11 and at step S510, the file update time acquired by the file update time acquisition section 525 is stored in the file update time storage section 534 of the storage section 53.

Next, the access operation to the memory card 11 inserted into the connector 31 at present will be discussed. FIG. 10 is a flowchart to describe a processing procedure of the access operation to the memory card in the embodiment.

In FIG. 10, steps S601 to S606 and steps S609 to S612 are the same as steps S401 to S410 in the flowchart of FIG. 7 in the second embodiment and will not be discussed again.

At step S607, the file update time acquisition section 547 of the card access section 54 acquires the file update time from the memory card 11. At step S608, the file update time comparison section 548 makes a comparison between the acquired file update time of the memory card 11 this time and the file update time stored in the file update time storage section 534 of the storage section 53 and determines whether or not they are identical.

If the file update times differ as a result of the determination, at step S609 it is determined that the previously inserted memory card 10 is once removed and a file on the memory card is updated in another terminal and then the memory card is inserted, and a card information acquisition section 343 acquires the card information from the memory card 11 inserted into the connector 31 at present. At step S610, the card information acquired by the card information acquisition section 343 is stored in a card information storage section 332 of the storage section 53.

The card information acquisition section 343 of the card access section 43 need not acquire all the card information of the memory card inserted at present and may acquire only a different portion from the previously acquired card information based on the comparison processing result of a file organization information comparison section 445 and the file update time comparison section 548. Accordingly, the time required for acquiring the card information can be shortened.

On the other hand, at step S608, it is determined that the file update time are identical, steps S609 and S610 are skipped and the process goes to step S611 and the memory card is accessed based on the card information of the memory card 10 stored in the card information storage section 332.

As described above, according to the insertion/removal detector in the third embodiment of the invention, the file update time is also acquired and is compared with the previously stored file update time in addition to the process of acquiring the ID of the inserted memory card and comparing the ID with the previously stored ID and acquiring the file organization information and comparing it with the previously stored file organization information, whereby whether or not the previously inserted memory card and the memory card inserted at present are identical can be detected. If the same memory card is inserted, it is made possible to detect whether or not the memory card is removed halfway and a file is deleted or is additionally recorded and a file is updated on the memory card in another terminal. Further, if a different memory card is inserted or if the file contents or the file update time is changed although the same memory card is inserted, it is made possible to take measures of anew acquiring card information from the memory card inserted at present, etc., and destruction of the data of the memory card can be prevented.

INDUSTRIAL APPLICABILITY

The invention has the advantage that it can provide an insertion/removal detector capable of detecting insertion and removal of external memory with the external memory to be inserted and removed through an adapter, and capable of preventing recorded data from being destroyed with insertion or removal of external memory, and is useful for a terminal such as a mobile telephone or a PDA.

The invention claimed is:
1. An insertion/removal detector, comprising:
an insertion detection section which is adapted to detect that an adapter into which an external memory is inserted has been inserted into a connector for inserting the adapter;

a first identification information acquisition section which is adapted to acquire first identification information to identify first external memory which the insertion has been detected by the insertion detection section;

a first external memory information acquisition section which is adapted to acquire first external memory information concerning the first external memory;

an access request section which is adapted to send an access request to the first external memory;

a second identification information acquisition section which is adapted to acquire second identification information to identify second external memory inserted into the adapter inserted into the connector at the time of the access request;

an identification information comparison section which is adapted to make a comparison between the first identification information and the second identification information and to determine whether or not they are identical;

a first file organization information acquisition section which is adapted to acquire first file organization information concerning file organization of the first external memory;

a second file organization information acquisition section which is adapted to acquire second file organization information concerning file organization of the second external memory if the identification information comparison section determines be identical; and a file organization information comparison section which is adapted to make a comparison between the first file organization information and the second file organization information and to determine whether or not they are identical;

a second external memory information acquisition section which is adapted to acquire second external memory information concerning the second external memory if the identification information comparison section determines not identical or if the file organization information comparison section determines not identical.

2. The insertion/removal detector as claimed in claim 1, further comprising:

a first update time information acquisition section which is adapted to acquire first update time information concerning file update time of the first external memory;

a second update time information acquisition section which is adapted to acquire second update time information concerning file update time of the second external memory if the file organization information comparison section determines be identical; and an update time information comparison section which is adapted to make a comparison between the first update time information and the second update time information and to determine whether or not they are identical, wherein if the update time information comparison section determines not identical, the second external memory information acquisition section is adapted to acquire the second external memory information.

3. The insertion/removal detector as claimed in claim 1, wherein the second external memory information acquisition section is adapted to acquire difference information concerning a difference between the first external memory information and the second external memory information.

4. The insertion/removal detector as claimed in of claim 1, wherein the insertion detection section includes a detection circuit for detecting that the adapter has been inserted into the connector.

5. A method of insertion/removal detection in an insertion/removal detector, comprising the steps of:

detecting that an adapter into which an external memory is inserted has been inserted into a connector for inserting the adapter;

acquiring first identification information to identify first external memory which the insertion has been detected by the insertion detection section;

acquiring first external memory information concerning the first external memory;

sending an access request to the first external memory;

acquiring second identification information to identify second external memory inserted into the adapter inserted into the connector at the time of the access request;

making a comparison of identification information between the first identification information and the second identification information and to determine whether or not they are identical;

acquiring first file organization information concerning file organization of the first external memory;

acquiring second file organization information concerning file organization of the second external memory if determined to be identical in the step of making the comparison of identification information; and making a comparison of file organization information between the first file organization information and the second file organization information and to determine whether or not they are identical;

acquiring second external memory information concerning the second external memory if determined to be not identical in the step of making the comparison of identification information or if determined to be not identical in the step of making the comparison of file organization information.

* * * * *